(12) United States Patent
    Namvar

(10) Patent No.: US 9,930,289 B2
(45) Date of Patent: Mar. 27, 2018

(54) ARRANGEMENT FOR VERIFICATION OF SIGNAL UNITS IN A SUBSCRIBER RECEIVER

(76) Inventor: Kianoush Namvar, Kista (SE)

( * ) Notice: Subject to any disclaimer, the term of this patent is extended or adjusted under 35 U.S.C. 154(b) by 0 days.

(21) Appl. No.: 12/987,081

(22) Filed: Jan. 7, 2011

(65) Prior Publication Data

US 2011/0107366 A1   May 5, 2011

Related U.S. Application Data

(63) Continuation of application No. 12/349,842, filed on Jan. 7, 2009, now abandoned, which is a continuation of application No. 10/148,389, filed as application No. PCT/SE00/02406 on Dec. 1, 2000, now Pat. No. 7,493,637.

(30) Foreign Application Priority Data

Dec. 1, 1999   (SE) ..................... 9904360

(51) Int. Cl.
    *H04N 7/10*    (2006.01)
    *H04N 7/16*    (2011.01)
    *H04N 21/426*  (2011.01)
    *H04N 21/4627* (2011.01)
    *H04H 60/15*   (2008.01)
    *H04H 60/51*   (2008.01)
    *H04N 5/44*    (2011.01)

(52) U.S. Cl.
    CPC .............. *H04N 7/10* (2013.01); *H04H 60/15* (2013.01); *H04H 60/51* (2013.01); *H04N 7/163* (2013.01); *H04N 7/166* (2013.01); *H04N 21/42676* (2013.01); *H04N 21/4627* (2013.01); *H04N 5/44* (2013.01)

(58) Field of Classification Search
    CPC .......... H04N 7/10; H04N 7/166; H04N 7/163; H04N 21/42676; H04N 21/4627; H04N 5/44; H04H 60/15; H04H 60/51
    See application file for complete search history.

(56) References Cited

U.S. PATENT DOCUMENTS

| | | | | |
|---|---|---|---|---|
| 4,225,884 A | * | 9/1980 | Block et al. ................ | 380/233 |
| 4,245,245 A | * | 1/1981 | Matsumoto et al. ........ | 380/211 |
| 4,523,190 A | * | 6/1985 | De Roo ...................... | 370/486 |
| 4,558,464 A | * | 12/1985 | O'Brien, Jr. ................ | 380/240 |
| 5,247,575 A | * | 9/1993 | Sprague et al. ............. | 705/53 |
| 5,387,942 A | * | 2/1995 | Lemelson .................... | 725/28 |
| 6,009,116 A | * | 12/1999 | Bednarek et al. ........... | 375/130 |
| 6,058,421 A | * | 5/2000 | Fijolek et al. .............. | 709/225 |
| 6,067,440 A | * | 5/2000 | Diefes ......................... | 725/27 |
| 6,100,916 A | * | 8/2000 | August et al. ............... | 725/28 |

* cited by examiner

*Primary Examiner* — Chenea Smith
(74) *Attorney, Agent, or Firm* — The Webb Law Firm

(57) ABSTRACT

The present invention relates to an arrangement for transmission of signal units to at least one receiver. The receiver is being arranged to receive a number of signal units within a frequency range and a comparator unit being arranged to make possible for at least a portion of the signal units to be forwarded or at least partially be blocked with respect to the receiver. A verification unit is arranged to verify that the forwarded signal units correspond to a corresponding signal unit in a memory. If the forwarded signal unit do not correspond to a corresponding signal unit in the memory the particular signal unit is being registered by means of a specific signal in a register unit.

22 Claims, 4 Drawing Sheets

ARRANGEMENT FOR VERIFICATION OF SIGNAL UNITS IN A SUBSCRIBER RECEIVER

CROSS-REFERENCE TO RELATED APPLICATIONS

This application is a continuation of U.S. patent application Ser. No. 12/349,842, filed on Jan. 7, 2009 now abandoned, which is a continuation of and claims the benefit of the filing date and priority to U.S. patent application Ser. No. 10/148,389, filed on May 31, 2002 now U.S. Pat. No. 7,493,637, which claims the benefit of the filing date and priority to International Application No. PCT/SE00/02406 filed on Dec. 1, 2000, which claims the benefit of the filing date and priority to Swedish Application No. 9904360-6 filed on Dec. 1, 1999. All of the above applications are incorporated by reference in their entirety.

THE BACKGROUND OF THE INVENTION AND PRIOR ART

The present invention relates to an arrangement for transmission of signal units to at least one receiver.

As far as, for instance, TV-signals are concerned, these may reach viewers via terrestrial transmitters, cable networks or satellites. Each transmitted TV-channel comprises an image signal, a so-called video signal and one or more sound signals, so-called audio signals and usually a text-TV-signal. All signals are modulated onto a carrier wave. The TV-receiver, which is connected to the TV receiver antenna receives the signals. The channel selector in the TV-receiver, i.e. the unit for channel tuning in the TV-receiver, tunes into a desired TV-channel, where after the signals are detected, i.e. demodulated. The sound signal is fed to the speaker for acoustic reproduction and the image signal is fed to a decoder where after the image reproduction can take place.

For instance, cable TV-transmissions are encrypted, i.e. the respective signals characteristics is altered, with the aim of preventing unauthorised viewing, i.e. preventing image- and sound reproduction of pay-TV-channels for which no payment has been made. In order to receive such signal and reproduce it in a satisfactory manner the TV-receiver may include means, such as a separate decoder being arranged to decrypt the respective encrypted signal to its original characteristics where after image- and sound reproduction can take place in a satisfactory manner.

However, such decoder may be manipulated, whereby the image- and sound reproduction can take place in a satisfactory manner without a user having paid for the TV-channel in question.

Different transmission- and reception systems for encrypted TV-signals are known which are arranged to render unauthorised image- and sound reproduction more difficult.

EP, A2, 0 489 385 discloses one such system. The signals are encrypted in such manner that they cannot be received and decrypted by means of a regular TV-receiver, but only by means of a receiver that includes an adapted decoder, which includes a control circuit that periodically receives a secret code from a central computer via a telephone line, whereby the secret code is necessary for the decryption operation. The secret code is sent according to an encrypted format and at irregular time intervals. Furthermore, the secret code is altered with the aim at ensuring the system's security. The secret code is transmitted to the user under the condition that he/she has paid for a particular channel, for instance, during a previous payment period.

The international patent application WO, A1, 97/23996 describes a method and an apparatus for selection of programs and channels according to a specific user's preferences with respect to, for instance, avoidance of certain program types or specific programs. Alternatively, the user may choose only to have particularly offensive or objectionable portions in the programs that are transmitted to his/her receiver blocked or substituted by alternative sound- or audio sequences. The setting of the selection function is exclusively effected locally at the particular user location. The user thus has full freedom to determine what should be blocked and what should be allowed through.

SUMMARY OF THE INVENTION

The object of the present invention is to provide an arrangement by means of which it is possible to block specific signals, such as certain TV-signals, from a central computer, such that the signals never reach a user's TV-receiver. Hence, the signals will not have to be encrypted with the aim at preventing unauthorised sound- and image reproduction.

This object is achieved by the initially arrangement described that comprises a receiving means being arranged to receive a number of signal units within a frequency range, whereby each signal unit includes at least one signal, and a forwarding means is arranged to make possible for at least a portion of said signal units to be forwarded or at least partially be blocked with respect to said receiver. The arrangement is thus intended to be arranged between a receiver antenna and said receiver. According to the invention, it is thereby possible to exclusively allow those signal units to pass the arrangement that said receiver, for instance a TV-receiver, has authorised access to.

The signal units that are received by the receiving means have usually been passed through some kind of signal processing and been modulated according to some kind of modulation method. However, the receiving means that comprises a receiver includes the equipment necessary to demodulate the signal units to baseband. The arrangement may either process the signal units as analogue signal units or as digital signal units. The transmitted signal units may have been sent via telephone line, a coaxial cable, a radio connection, a satellite channel, a radio relay system, fibre optics or a combination of some of these physical media.

The arrangement also comprises a registering means, which in turn includes a register over at least those signal units to which said receiver has authorised access. The forwarding means is thereby arranged to exclusively forward such signal units that correspond to a corresponding signal unit in the register. Consequently, the forwarding means compares the signal units in question with the signal units being stored in the register. Only those signal units in question which have a correspondence in the register are forwarded by the forwarding means. The forwarding means may thus comprise a comparator unit being arranged to compare the separated and selected signal units with said signal units in the register. According to a preferred embodiment of the invention, said unique identification is arranged to make possible said comparison. The blocking of signal units in the forwarding means is effected electronically and may be accomplished by different means. The signal units may also contain or be associated with time information, whereby a temporary availability is made possible. By indicating a start point in time and a possible end point in time, the signal units may be allowed to pass through the forwarding means during the interval being defined between these points in time. However, the signal units in question are blocked at any other time.

The register in the registering means is an active register in which it is possible to erase stored signal units and to add further signal units. Moreover, said register is arranged such that it is possible to effect said erasure and said addition over a communications system. One possibility is to realise said erasure and said addition via a telecommunications network, whereby the arrangement may include a modem. The arrangement thus has a unique address for said communication, which may be encrypted. It is also possible that said erasure and said addition takes place via, for instance, a satellite channel or a cable network. A secret code may be sent under an encrypted format in connection with said erasure and said addition, whereby the secret code is necessary for said erasure respective said addition of signal units. The erasure and the addition, of course, also involves altering of signal units. According to an embodiment of the invention, the secret code is changed periodically in order to ensure the security of the system. The central computer includes a register over those unique addresses respective codes that represent authorised users in the system.

According to an additional embodiment of the invention, the arrangement includes a selecting means being arranged to separate and select the received signal units from one another. This may be accomplished by filtering. The selection means may include one or more filters, for instance, one filter for each frequency or frequency band which should be separated and selected.

According to an additional embodiment of the invention, at least one of said signal units includes at least two signals, whereby said selecting means is arranged to separate and select said signals in said signal unit. Said signals may be a video signal and an audio signal of a specific TV-channel, whereby said selecting means may be arranged to separate and select said video signal and audio signal. It is thereby possible to exclusively have the video signal forwarded by said forwarding means, whereby said receiver, i.e. in this case the TV-receiver, exclusively receives the video signal and thus a user only has a possibility to reproduce the image in said TV-channel.

According to an additional embodiment of the invention, the arrangement includes an identifying means for detecting the incoming signal and provide at least each signal unit with a unique identification. Preferably, said unique identification includes a digital identification, whereby the identifying means is arranged to superimpose the digital identification onto the respective signal unit. If the signal unit in question includes a video signal and an audio signal, said identifying means may be arranged to provide both said signals with a respective digital identification that is superimposed onto the signal in question. This identification may be allocated at transmission of a respective signal unit, via for example a cable TV-network or a satellite link. The identification may include information pertaining to, for instance, signal type and frequency.

According to an additional embodiment of the invention, the arrangement includes a verification means, which comprises a memory unit for storing those signal units to which said receiver has authorised access and which is arranged to verify that the signals being forwarded by said forwarding means correspond to a corresponding signal unit in said memory unit, whereby if said forwarded signal units do not correspond to a corresponding signal unit in the memory unit the particular signal unit is being registered by means of a specific signal in a registering unit. The operation of said verification unit is thus to investigate whether signal units leave the arrangement to which said receiver does not have authorised access, the verification unit checks the reliability of said forwarding means. The verification means is not arranged to block the signal units in question that do not have a correspondence in said memory, however said signal units are stored in said registering unit. Said verification means may be arranged such that all signal units that pass the arrangement are registered in the registering unit, whereby those signal units that pass said arrangement and are not found in said memory unit are registered together with certain additional information. These events may, for instance, be registered in the form of a log along with date and time information. Furthermore, text-TV-pages that are presented in the receiver may be registered together with page number and time of presentation (date and time).

According to an additional embodiment of the invention, said signal units in the registering unit are formatted to be transmitted to a central computer. Said transmission may be effected according to various means, whereby one possibility is that it takes place over a telephone line, whereby the arrangement may include a modem. The arrangement includes a computer, whereby a control unit in the computer may be arranged such that the stored data in said registering unit are transmitted to said central computer according to certain time intervals, for instance once per day. In case said arrangement is arranged between a TV-receiver antenna and a TV-receiver it is thus possible to verify, by means of said central computer, whether a signal unit to which said TV-receiver does not have authorised access is nevertheless received by said TV-receiver. A software in said computer controls the registration of signal units in said registering unit. The central computer may re-configure the software in said computer, for instance, by remote upgrading of the arrangement. The central computer may also control said time intervals for transmission and the extent of the registered information that is being transmitted.

In connection with satellite reception of TV-signals (or other reception where an external decoder is being utilised), i.e. signal units, in home environments it is possible to, by means of the inventive arrangement, register for example viewer habits. By having the verification means arranged such that all signal units that pass the verification means are registered in the registering unit with time and date, viewer surveys, statistical investigations etc are made possible. The central computer includes software for receiving and processing such registrations in a desired manner. Furthermore, multiple users may be registered for one and the same arrangement. Each individual then togs in to the arrangement, for instance, by entering a unique code via a remote control, by means of voice recognition, a finger print or eye control.

According to an additional embodiment of the invention, said receiver includes one of a TV-receiver, a satellite receiver and a radio receiver. By radio receiver is understood a receiver being used for wireless communication, for instance a mobile telephone.

According to an additional embodiment of the invention, the arrangement is connected to an interface unit via which information may be exchanged with the central computer over at least one communications network. This network may communicate according to arbitrary standard and utilise anyone of the access technologies known today.

According to an additional embodiment of the invention, the arrangement is connected to a switch, which is arranged to automatically select an interface in the interface unit that is adapted to at least one of the communications networks.

According to an additional embodiment of the invention, the arrangement is connected to a picture telephone unit through which a signal being specifically directed to the receiver can be received and a locally recorded video signal can be returned such that a picture telephone link can be established between the user and at least one other user.

According to an additional embodiment of the invention, the arrangement is included in a subscriber unit, which in turn includes a GPS receiver. The GPS receiver is arranged to convey positional information to the central computer. The positional information may constitute a basis for which signal units that are forwarded to the receiver respective are blocked by the forwarding means. Typically, the positional information can be utilised for graphical presentation of subscriber data to the operator, for instance, on a map where each subscriber is represented by his/her graphical position. Information and statistics pertaining to a specific user can be presented on the map in connection with his/her geographical position by means of a digital graphical interface.

The positional information also gives the central computer a possibility to determine whether the subscriber unit has been repositioned and possibly thereby also by other means been modified in an unauthorised way.

According to an additional embodiment of the invention, a unique identity is linked to the registering means. On basis of this identity signal units may either be forwarded or blocked by the forwarding means, such that the signal units only reach the specific users, which are indicated by the unique identity.

Depending on which type of signal units that have been received by the arrangement according to the invention and the signal processing that has been performed in the arrangement according to the invention, it may be necessary to further process the forwarded signal units before transferring them to the intended receiver.

BRIEF DESCRIPTION OF THE DRAWINGS

The present invention is now to be explained by means of an exemplary embodiment and with reference to the attached drawing, of which

DETAILED DESCRIPTION OF AN EMBODIMENT OF THE INVENTION

Figure 1:
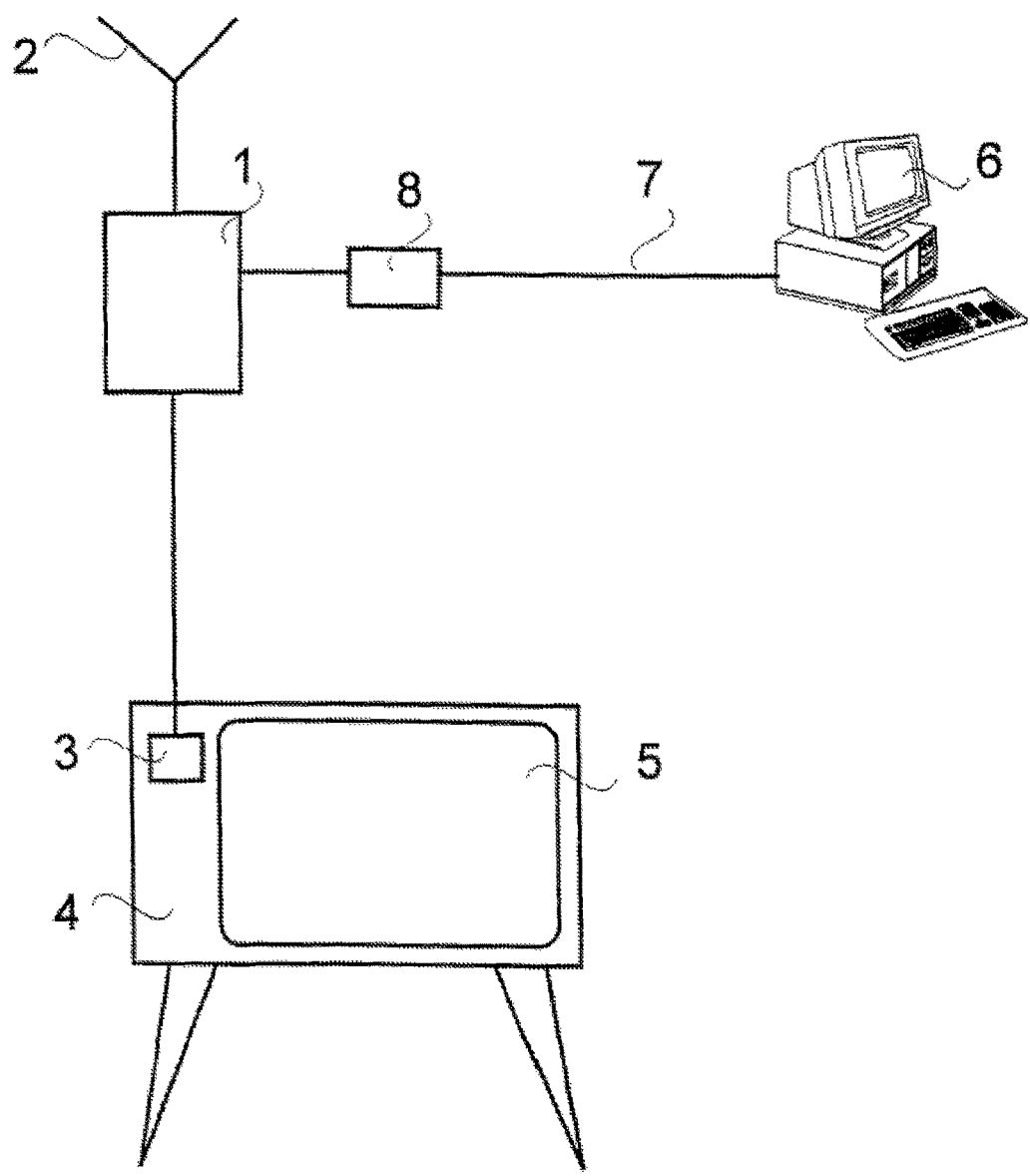
FIG. 1 shows how the arrangement is arranged between a TV-receiver antenna and a TV-receiver, and how a central computer is connected to the arrangement.

FIG. 1 shows how an arrangement 1 according to the invention is arranged between a TV-receiver antenna 2 and a TV-receiver 3 in a TV-set 4. The TV-set 4 may be of conventional type and includes a screen 5 and the equipment necessary for i.a. the image- and sound reproduction. The arrangement 1 makes it possible to block signal units to which the TV-receiver does not have authorised access. It should be noted that an arrangement according to the invention may be arranged in connection with different types of receivers, such as satellite receivers, radio receivers etc. Furthermore, it should be noted that the arrangement 1 is preferably located such at a TV-viewer who uses the TV-set 4 is unaware of the arrangement's 1 existence The arrangement 1 includes a computer. Moreover, it is possible to communicate with said arrangement 1 from, for instance, a central computer 6 via e.g. a telephone line 7 which is made possible by means of a modem 8. The power supply of said arrangement 1 can be accomplished by various means and will not be further mentioned in this application.

Figure 2:
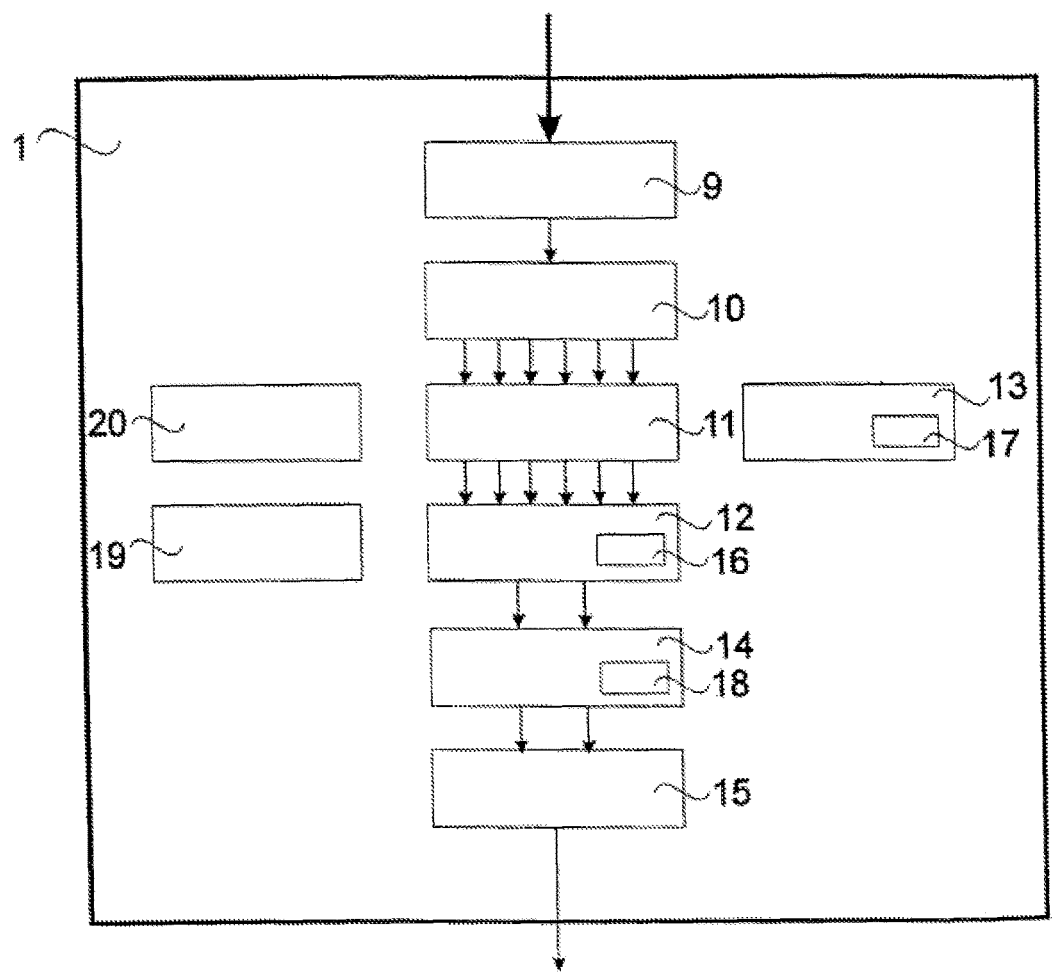
FIG. 2 shows parts of the arrangement according to FIG. 1 and how the signals are led through the arrangement.

The arrangement 1 includes a receiving means 9, a selecting means 10, an identifying means 11, a forwarding means 12, a registering means 13, a verification means 14 and a post processing means 15 as shown in FIG. 2. The function of the receiving means 9, the selecting means 10, the identifying means 11, the forwarding means 12, the registering means 13, the verification means 14 and the post processing means 15 will be described in further detail in connection with the description of how the signal units are led through the arrangement 1.

The TV-signals, i.e. the different TV-channels, may reach the TV-receiver 3 via, for instance, terrestrial transmitters, cable networks or satellites. The different TV-channels include, for example, an image signal, a so-called video signal and one or more sound signals, so-called audio signals and usually a text-TV-signal. All signals are modulated onto a carrier wave. When the different signal units, i.e. the TV-channels, reach the arrangement 1 they are received by the arrangement's 1 receiving means 9. In the receiving means 9, which includes a receiver, the different signals in the signal unit in question, i.e. TV-channels, are converted to baseband. After that, the signal units in question reach the selecting means 10 that is arranged to separate and select the signal units in question from one another. This is accomplished by filtering. The selecting means 10 may comprise one or more filters, for instance, one filter for each frequency band which should be separated and selected. In a following step the selected signal units reach the identifying means 11, which is arranged to detect a signal type and depending on the signal type allocate a unique identification to the selected signal unit in question, for instance, in the form of a digital identification being superimposed onto the signal unit in question. This identification may be allocated initially at the transmission of the respective signal units, via for instance, a cable TV-network or a satellite link.

The signal units in question, that include the digital identification, reach the forwarding means 12 in a next step. The forwarding means 12 includes a comparator unit 16 being arranged to compare the separated signal units in question with the contents of a register 17 in the registering means 13. The register 17 includes those signal units that the TV-receiver 3 has authorised access to. Only the signal units in question that have a correspondence in the register 17 are forwarded by the forwarding means 12.

After this, the forwarded signal units reach the verification means 14. The verification means 14 includes a memory unit 18, which in similarity with the registering means 13 includes those signal units to which the TV-receiver 3 has authorised access. Utile signal units that are being forwarded by the forwarding means 12 do not have a correspondence in the memory unit 18, these signal units will be stored along with a warning signal in a register unit 19 in the arrangement 1. Before the forwarded signal units leave the arrangement 1 the signal units are processed in the post processing means 15 with respect to the TV-receiver 3.

The registering means 13 is furthermore allocated a unique identity in the form of an ID-number and an ID-code. The unique identity offers a possibility to arrange, group or categorise users in different ways. For instance, it is possible to based on the unique identity and data concerning the user, such as age, sex, civil status or occupation, send signal units to the user that are specifically directed to users that fulfil certain criteria, such as being male and within a particular age interval. The software in the central computer includes means for processing statistical data pertaining to the users plus means for presenting the data to the operator via, for instance, a graphical interface.

Moreover, an international employer or other larger organisation may convey signals to a very specific and well-defined target group by utilisation of these unique identities. All the arrangements whose ID numbers are included in a listing in the central computer over authorised receivers may receive the transmitted signal units, while all other arrangements block the signal. Alternatively, ID-numbers may be allocated according to a geographical plan such that ID-numbers within a particular interval correspond to users within a given geographical area (a country, a city, a region etc.). It is thereby possible to receive certain signal units selectively within given geographical areas, which can be utilised, for instance, by film distributors in order to avoid collision with other media in other regions, such as cinemas. Moreover, data to be presented via a map image can be generated. This map image may, for instance, relate statistics and viewer habits to different geographical areas.

According to another embodiment of the invention, the transmission of the signal units is accomplished via the Internet in the form of Web-TV/Internet-TV (for instance via the Philips product CleverCast PC), whereby the ID-number is linked to a particular IP-address. By utilising this embodiment the arrangement's user is provided access to the Internet, whereby the user, for instance, may connect to various home pages.

It should be noted that the memory unit 18 may be left out, whereby the verification unit 14 is arranged to compare those signal units that pass the verification unit 14 with the signal units that are registered in the register 17 in the registering means 13. According to another embodiment of the invention, the verification means 14 may be located outside the arrangement 1, whereby the order between the post processing means 15 and the verification means 14 is reversed in relation to what is shown in FIG. 1.

The arrangement 1 may, for instance, be placed centrally in a block of flats, while the verification means 14 may be located in direct proximity to the respective users' TV-receivers 3.

The arrangement 1 includes a control unit 20 that is arranged such that data being stored in the register unit 19 is transferred to the central computer 6 at particular time intervals.

The central computer 6 may erase or add signal units to the register 17 in the registering means 13 and in the memory unit 18 of the verification means 14 by means of the control unit 20. All such alterations are stored in the register unit 19 together with time- and date information, whereby it is possible verify from the central computer 6 that the intended changes have in fact been effected as well as when this took place.

According to an alternative embodiment of the invention, the control unit 20 may be arranged to replace certain received signal units with given other pre-determined signal units in the form of audio- and/or image sequences. This is controlled by time indications being associated to the signal units or by means of special control pulses being sent out.

Irrespective of whether the verification unit 14 is localised internally or externally relative the arrangement 1, the registered information is forwarded to the central computer 6, either via the arrangement 1 or via a separate modem.

Figure 3:
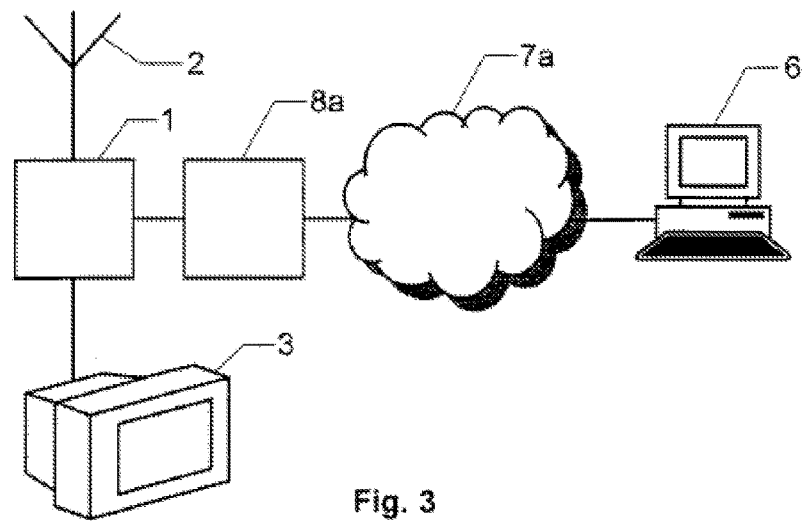
FIG. 3 shows a generalisation of the arrangement according to FIG. 1.

In the embodiment shown in FIG. 1 the arrangement 1 according to the invention is connected with a central computer 6 via a modem 8 and a telephone line 7. Naturally, it is also possible to establish a connection between the arrangement 1 and the central computer 6 by means of other transmission media than telephone tines. In fact, a channel for this communication may be set up over arbitrary network or combination of networks via which an information exchange between the arrangement 1 and the central computer 6 can be accomplished. FIG. 3 shows a generalisation of the assembly in FIG. 1, where the arrangement 1 is connected to a receiver antenna 2 for reception of signal units, such as data-, radio- or TV-signals. Furthermore, the arrangement 1 is connected to a receiver 3 for reproduction of the signals that have been received via the receiver antenna 2. Thus, the receiver 3 is typically a radio- or a TV-receiver, however it can naturally include an arbitrary number of other alternative decoders for different types of signals. Instead of the modem 8, the arrangement 1 communicates with the central computer 6 via an interface unit 8a, which is adapted to at least one interface besides PSTN, i.e. the regular telecommunications network for voice telephony (PSTN=Public Switched Telephone Network). The interface unit 8a may thus be adapted to direct communication over the Internet, via PLMN (PLMN=Public Land Mobile Network), the electric power network, by means of a satellite or via an equivalent public or private communications network. This is illustrated in FIG. 3 by means of a general network 7a. The central computer 6 is also directly, or indirectly via one or more other networks, connected to the general network 7a. Information may thereby be exchanged between the arrangement 1 and the central computer 6.

Figure 4:
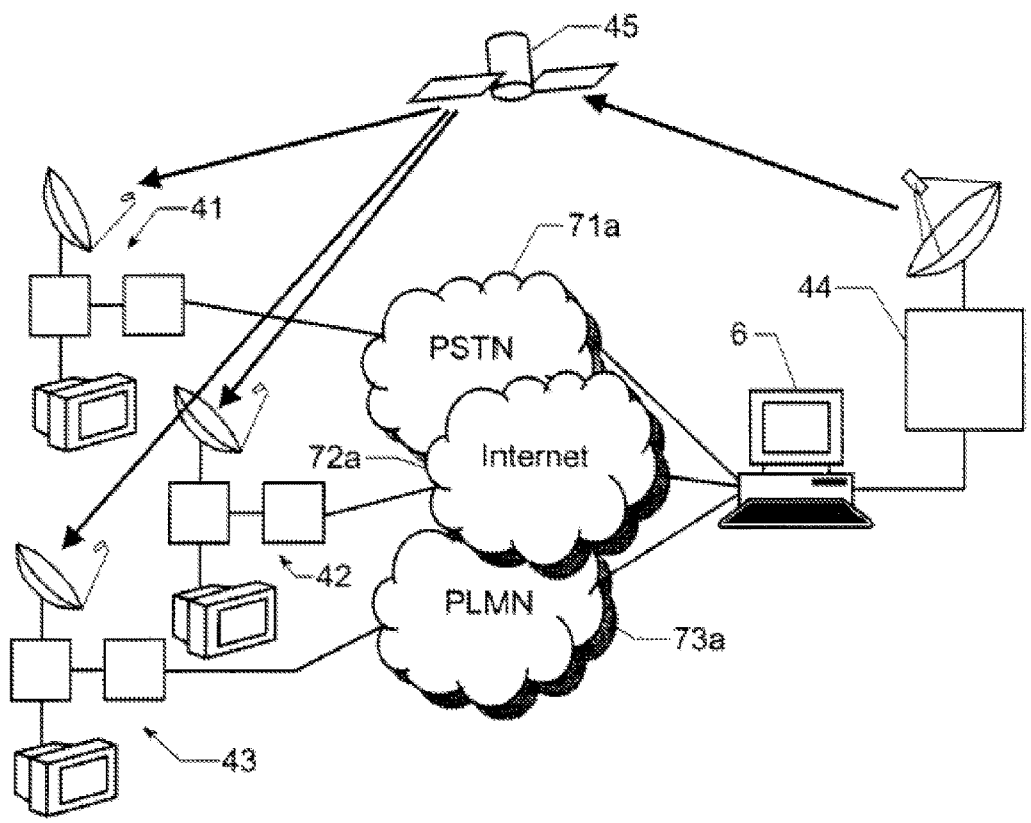
FIG. 4 shows an exemplifying system, which includes receivers that are connected via the proposed arrangement.

FIG. 4. shows an example of a system, which includes subscriber units 41, 42 respective 43 that each comprises a receiver antenna 2, an arrangement a receiver 3 and an interface unit 8a according to what has been described with reference to FIG. 3 above. A satellite transmitter 44 in the system transmits signal units via a satellite 45, which preferably is positioned in a geostationary orbit around the earth. The receiver antenna 2 in the respective subscriber unit 41-43 is adapted to receive the signal units that are forwarded by the satellite 45. According to a preferred embodiment of the invention, the satellite transmitter 44 is directly, or indirectly, connected to a central computer 6, such that this computer can be updated with respect to which signal units (typically channels, programs or data signals) that are sent out. Possibly, the central computer 6 is also given a possibility to control the transmission of signal units from the satellite transmitter via this connection. According to the illustrated example, a first subscriber unit 41 is attached to the central computer 6 via PSTN 71a, a second subscriber unit 42 communicates with central computer 6 at least partially over the Internet 72a and a third subscriber unit 43 exchanges information with the central computer 6 at least partly via a PLAIN 73a. This PLAIN may be constituted by a mobile communications network of arbitrary standard and access technology. It may, for instance, be a. GSM-network (Global System for Mobile communication), a TDMA-network (Time Division Multiple Access), a CDMA-network (Code Division Multiple Access) or a W-CDMA-network (Wideband-CDMA). The arrangement 1 is preferably controlled from the central computer 6 by means of control signals being transferred via the satellite system in case of satellite reception of signal units.

Figure 5:
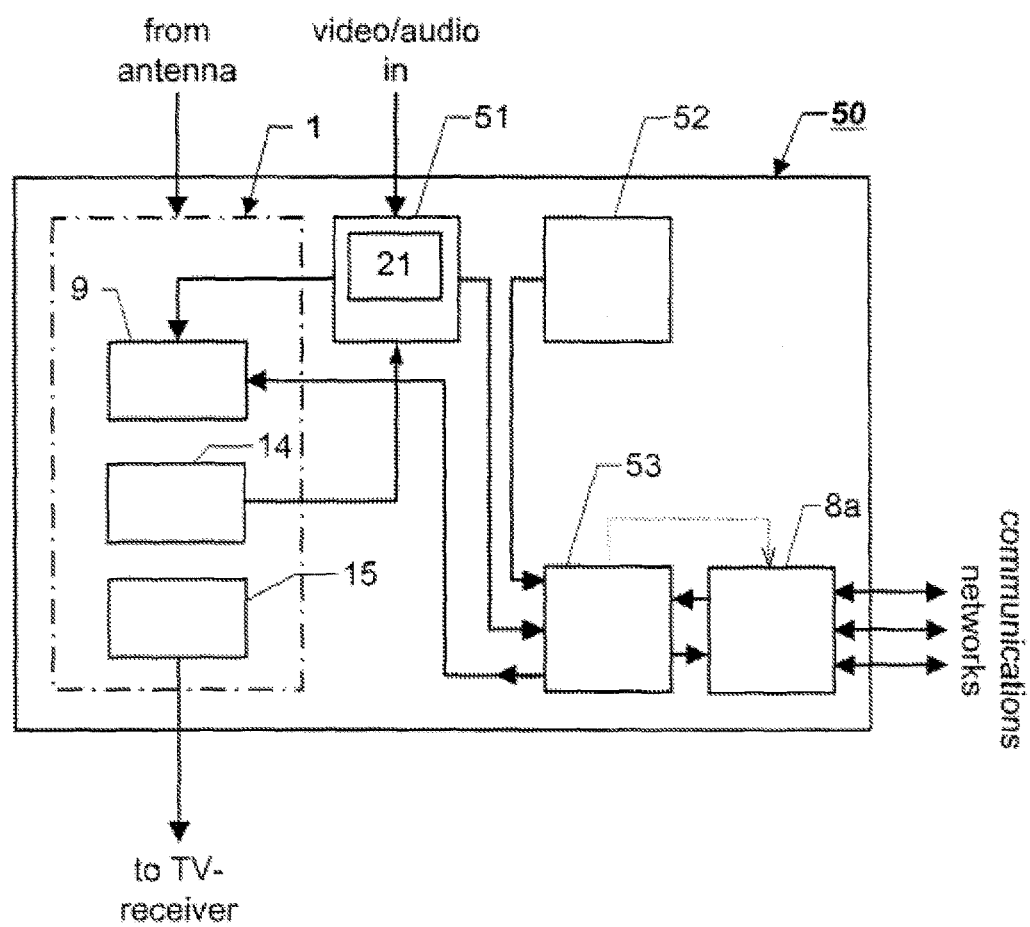
FIG. 5 shows an embodiment, where the proposed arrangement is included in a subscriber unit having extended communication possibilities.

FIG. 5. shows an embodiment, where the proposed arrangement 1 is included in a subscriber unit 50 having extended communication possibilities. Besides the arrangement 1a. GPS-receiver 52 (GPS=Global Positioning System) is included in the subscriber unit 50. Furthermore, the subscriber unit 50 includes a switch 53 for effecting an automatic choice of interface towards the central computer.

The GPS-receiver 52 registers the subscriber unit's 50 geographical position and thereby gives an indirect indication of the position of the receiver(s), which is(are) connected to the subscriber unit 50. The positional information may be utilised for controlling transmission of signal units within given geographical areas, such as a specific country, a specific city etc. An operator can thereby be ensured that a particular program or a particular channel cannot be received outside the desired area of distribution. A map may be used to graphically illustrate where the subscribers are located geographically. Each subscriber is here represented via a mark on the map and by activation of a specific subscriber's mark (for instance by means of an electronic pointer means, such as a computer mouse) information and statistics pertaining to the subscriber are presented.

The positional information may moreover be utilised by the central computer in order to determine whether the subscriber unit 50 has been repositioned from its original location and perhaps thereby also been modified or transferred to another user. An updated positional information is sent out at regular intervals, via the switch 53 and an interface unit 8a, over a communications network to the central computer. If the positional information would indicate a repositioning of a particular subscriber unit 50, the central computer preferably sends out a command to the registering means 13 in the arrangement 1 in this subscriber unit 50, which (if the operator so desires) may result in that the selecting means henceforth will block all received signal units.

According to a preferred embodiment of the invention, the central computer sends a page signal to the subscriber in connection with the effecting of such blocking. Typically, the page signal is sent out to the subscriber (with the particular ID-number) a time period before the moment when all received signal units are actually blocked, such that the subscriber is given an opportunity to object against the blocking being effected.

The UPS-receiver 52 may in additionally be used for automatic setting of a time reference (such as a clock) in the arrangement 1.

The picture telephone unit 51 has an input for connection to a local video signal, from for instance a picture telephone or a video camera. A picture telephone signal may thereby be reproduced in a TV-receiver being connected to the subscriber unit 50. A sensor 21 in the arrangement 1 detects whether a local video signal is present on the picture telephone unit's 51 input. If this is the case, the control unit 20 connects this signal to the receiving means 9 for further transmission through the arrangement 1. Given that the subscriber has a picture telephone subscription with the operator the signal may pass the forwarding means in the arrangement 1 to the TV-receiver 3. The picture telephone image may either be shown separately across the entire screen 5 of TV-receiver 3 or be presented in parallel with other pictorial information in the form of, for instance, an image segment within a larger image. According to alternative embodiments of the invention, only one of the sound- and the image information is forwarded to the user's receiver.

Any communication between the arrangement 1 and the central computer is accomplished via, the switch 53 and the interface unit 8a. The latter has, according to a preferred embodiment of the invention, at least two alternative interfaces for communication via, at least two different communications networks. The subscriber unit 50 may thereby alternatively be connected to a first or at least one second communications network. As an alternative, the subscriber unit 50 may be simultaneously connected to at least two communications networks, such that if a connection via a primary network is broken, a connection may be established via, at least one secondary network. The switch 53 detects which network(s) that is (are) connected to the interface unit 8a and automatically controls the connection to these networks according to a pre-determined procedure.

The present invention is not restricted to the described embodiments, but may be varied freely within the scope of the following claims.

That which is claimed is:

1. Arrangement for transmission of signal units to at least one addressed receiver, wherein each signal unit includes at least one signal and a digital ID which is included in the transmitted signal or signal unit, comprising:
   at least one receiver configured to receive a number of signal units within a frequency range, wherein each signal unit of the number of signal units represents at least one of the following: a data signal, a text-tv signal, an audio signal, a video signal, or any combination thereof
   an identifying unit configured to identify said signal units on the basis of at least said digital ID
   a comparator unit configured to cause at least a portion of said signal units to be forwarded or at least partially be blocked with respect to said at least one addressed receiver, and
   a verification unit, which includes a memory configured to store at least those signal units to which said addressed receiver has authorized access and which is arranged to verify that the signals being forwarded by said comparator unit correspond to a corresponding signal unit in said memory, whereby if said forwarded signal units do not correspond to a corresponding signal unit in the memory the particular signal unit is being registered by means of a specific signal in a register unit.

2. Arrangement according to claim 1, characterized in that said signal units include at least one of a time information and a secret code.

3. Arrangement according to claim 1, characterized in that a unique identification includes at least a digital identification, whereby said digital identification includes identifying information pertaining to at least a time information, a secret code, signal type or frequency.

4. Arrangement according to claim 1, characterized in that at least one of said signal units includes at least two signals wherein one of said signals includes a video signal and that the other signal includes an audio signal and that said identifying unit is configured to provide said signals in said signal unit with said unique identification that is superimposed onto the respective signal.

5. Arrangement according to claim 3, characterized in that said identifying unit is configured to detect said digital identification of said signals or each signal unit.

6. Arrangement according to claim 1, characterized in that register includes at least those signal units to which said addressed receiver has authorized access, whereby said comparator unit is further configured to exclusively forward such signal units that correspond to a corresponding stored signal unit in said register.

7. Arrangement according to claim 6, characterized in that said register is an active register in which it is possible to erase stored signal units and add further signal units, and where said register is arranged such that said erasure and addition can be affected via a communications system.

8. Arrangement according to claim 6, characterized in that the unique identity is linked to the register which is configured to include at least one of an ID-number and an ID-address, whereby said unique identity forming a basis for which signal units that are being forwarded or blocked by the comparator unit.

9. Arrangement according to claim 1, characterized in that said comparator unit is configured to compare the signal units with said signal units in said register.

10. Arrangement according to claim 9, characterized in that at least one of said unique identification and digital identification is arranged to make possible said comparison.

11. Arrangement according to claim 1, characterized in that a verification unit is configured to verify said signal units being forwarded by said comparator unit.

12. Arrangement according to claim 6, characterized in that a verification unit is configured to register at least a portion of said signal units that pass the verification unit in the register.

13. Arrangement according to claim 1, characterized in that stored data in the register are formatted to be transmitted to a central computer.

14. Arrangement according to claim 1, characterized in that said addressed receiver comprises at least one of a TV-receiver, a satellite receiver and a radio receiver.

15. Arrangement according to claim 1, characterized in that it is connected to an interface unit through which information can be exchanged with a central computer over at least one communications network.

16. Arrangement according to claim 15, characterized in that it is connected to a switch, which is arranged to automatically select an interface in the interface unit that is adapted to at least one of the communications networks.

17. Arrangement according to claim 1, characterized in that it is connected to a picture telephone unit through which a picture telephone link is established between a user and at least one other user.

18. Arrangement according to claim 1, characterized in that it is included in a subscriber unit, which in turn comprises a positional information receiver, whereby the positional information forms a basis for which signal units that are being forwarded or blocked by the comparator unit.

19. Arrangement according to claim 15, characterized in that the central computer is arranged to include data pertaining to at least one of a unique identity, a unique identification, an ID-number, an ID-address and a unique address, which represents at least a subscriber, whereby said data forms a basis for said central computer to verify whether said receiver is authorized to forward said signal units.

20. Arrangement according to claim 15, characterized in that the central computer is arranged to include data pertaining to at least one of a unique identity, a unique identification, an ID-number, an ID-address and a unique address, which represents at least a subscriber, whereby said data forming a basis for said central computer to process said data pertaining to each users viewer surveys and statistical investigation.

21. A method for transmitting signal units to at least one addressed receiver, wherein each signal unit includes at least one signal and a digital ID, comprising:
 receiving a number of signal units within a frequency range at a signal transmitting arrangement, wherein each signal unit of the number of signal units represents at least one of the following: a data signal, a text-tv signal, an audio signal, a video signal, or any combination thereof;
 identifying the signal units on the basis of at least the digital ID;
 forwarding at least a portion of the signal units based at least partially on said digital ID; and
 verifying, each signal unit being forwarded and registering, the particular signal unit by means of a specific signal in a register unit if said forwarded signal unit do not correspond to a corresponding signal unit in memory.

22. An arrangement for transmission of signal units to at least one addressed receiver, wherein each signal unit includes at least one signal and a digital ID which is included in the transmitted signal or signal unit, comprising:
 (a) at least one receiver configured to receive a number of signal units within a frequency range, wherein each signal unit of the number of signal units represents at least one of the following: a data signal, a text-tv signal, an audio signal, a video signal, or any combination thereof;
 (b) at least one processor in communication with the at least one receiver and a register unit, the at least one processor configured to:
  (i) identify said signal units on the basis of at least said digital ID;
  (ii) cause at least a portion of said signal units to be forwarded or at least partially be blocked with respect to said at least one addressed receiver based at least partially on said digital ID, wherein each signal unit forwarded includes at least a digital ID that causes each signal or signal unit to be verified if each signal unit corresponds to a recognized corresponding signal unit;
  (iii) register the particular signal unit by means of a specific signal in the register unit, if said forwarded signal unit do not correspond to a corresponding signal unit in a memory.

* * * * *